United States Patent
Eleftheriou et al.

(10) Patent No.: US 8,443,273 B2
(45) Date of Patent: May 14, 2013

(54) DATA DEPENDENT NPML DETECTION AND SYSTEMS THEREOF

(75) Inventors: Evangelos S Eleftheriou, Rueschlikon (CH); Robert A. Hutchins, Tucson, AZ (US); Sedat Oelcer, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 12/750,350

(22) Filed: Mar. 30, 2010

(65) Prior Publication Data
US 2011/0246864 A1 Oct. 6, 2011

(51) Int. Cl.
*G06F 11/00* (2006.01)

(52) U.S. Cl.
USPC ............................................. 714/796; 714/794

(58) Field of Classification Search .................. None
See application file for complete search history.

(56) References Cited

U.S. PATENT DOCUMENTS

| | | | | |
|---|---|---|---|---|
| 2004/0189277 | A1* | 9/2004 | Michel | 324/76.16 |
| 2007/0110201 | A1* | 5/2007 | Mergen et al. | 375/350 |
| 2009/0195909 | A1* | 8/2009 | Eleftheriou et al. | 360/75 |

OTHER PUBLICATIONS

Kavcic et al., "The Viterbi Algorithm and Markov Noise Memory" © 2000 IEEE, IEEE Transactions on Information Theory, vol. 46, No. 1, Jan. 2000, p. 291-301.
Moon et al., "Pattern-Dependent Noise Prediction in Signal-Dependent Noise" © 2001 IEEE, IEEE Journal on Selected Areas in Communications, vol. 19, No, 4, Apr. 2011, p. 730-743.
Coker et al., "Noice-Predictive Maximum Likelihood (NPML) Detection" © 1998 IEEE, IEEE Transactions on Magnetics, vol. 34, No. 1, Jan. 1998, p. 110-117.

* cited by examiner

*Primary Examiner* — Christopher McCarthy
(74) *Attorney, Agent, or Firm* — Zilka-Kotab, PC

(57) ABSTRACT

According to one embodiment, a data detection system includes a coefficient-and-variance engine for selecting which infinite impulse response (IIR) filter and prediction error variance to process and store at any time, and a maximum-likelihood sequence detector. The coefficient-and-variance engine comprises a filter bank storing a plurality of IIR filters that represent a plurality of data-dependent noise whitening or noise prediction filters; a least-mean square (LMS) engine for adapting each IIR filter to actual noise conditions; a variance hank storing a plurality of prediction error variance values; and a data-dependent prediction error variance computation unit which updates the plurality of prediction error variance values. The maximum-likelihood sequence detector includes a metric computation unit that employs the plurality of IIR filters in the filter bank and the plurality of prediction error variances in the variance bank to adaptively compute detector branch metrics. Other systems and methods are also described in other embodiments.

20 Claims, 6 Drawing Sheets

DATA DEPENDENT NPML DETECTION AND SYSTEMS THEREOF

BACKGROUND

In the field of magnetic storage systems, when reading data from tracks written on magnetic media, such as the media employed in hard disk drives, tape drives, etc., distinct channels are used which form pathways from the sensing element to the unit responsible for processing the read-back signals. However, at high storage areal densities, conventional methods and devices which process the read-back signals from the magnetic media become highly sensitive to undesired signal variations, such as those caused by noise or parasitic events, and consequently are not able to recover the stored digital information in a reliable way. Noise may be caused by the electronics components used to condition the signal generated by the magnetic read head, by coupling events during the transmission of signals on connector cables, as well as by other phenomena that affect the way data are effectively written on and read back from the storage medium (such as data dependent media noise).

To address these issues, attempts have been made at improving the performance of data detection in read channels for magnetic storage systems, in particular tape storage systems. Known solutions to improve the performance of data detection in read channels that go beyond a traditional partial response maximum likelihood (PRML) channel design include noise-predictive maximum likelihood (NPML) schemes for signals disturbed by stationary or nonstationary noise, post-processing techniques, and other methods. As the noise process in a recording channel tends to have an autocorrelation characteristic that extends over a large number of symbol durations, which typically happens with a noise process having a strong moving average component, long finite-impulse response (FIR) prediction filters must be used to achieve efficient noise whitening. This represents a serious drawback in view of the high speed implementations typically needed in read channels, as well as in terms of the required chip area.

Therefore, a better method of improving the performance of data detection in read channels for magnetic storage systems would be very beneficial.

SUMMARY

In one embodiment, a data detection system includes a coefficient-and-variance engine for selecting which infinite impulse response (IIR) filter and prediction error variance to process and store at any time, and a maximum-likelihood sequence detector. The coefficient-and-variance engine comprises a filter bank storing a plurality of IIR filters that represent a plurality of data-dependent noise whitening or noise prediction filters; a least-mean square (LMS) engine for adapting each IIR filter to actual noise conditions; a variance bank storing a plurality of prediction error variance values; and a data-dependent prediction error variance computation unit which updates the plurality of prediction error variance values. The maximum-likelihood sequence detector includes a metric computation unit that employs the plurality of IIR filters in the filter bank and the plurality of prediction error variances in the variance bank to adaptively compute detector branch metrics.

According to another embodiment, a method includes selecting which IIR filter and prediction error variance to process and store at any time from a filter bank storing a plurality of IIR filters that represent a plurality of data-dependent noise whitening or noise prediction filters and a variance bank storing a plurality of prediction error variance values; adapting each IIR filter to actual noise conditions; updating the plurality of prediction error variance values, and employing the plurality of IIR filters in the filter bank and the plurality of prediction error variances in the variance bank to adaptively compute detector branch metrics.

In another embodiment, a data detection system includes a coefficient-and-variance engine for selecting which IIR filter and prediction error variance to process and store at any time, and a maximum-likelihood sequence detector. The coefficient-and-variance engine includes a filter bank storing a plurality of IIR filters that represent a plurality of data-dependent noise whitening or noise prediction filters, a LMS engine for adapting each IIR filter to actual noise conditions, a variance bank storing a plurality of prediction error variance values, and a data-dependent prediction error variance computation unit which updates the plurality of prediction error variance values. The plurality of IIR filters apply at least one of:

$$P_{\underline{a}}(D) = \frac{\gamma_1(\underline{a})D + \ldots + \gamma_N(\underline{a})D^N}{1 + \alpha_1(\underline{a})D + \ldots + \alpha_N(\underline{a})D^N}$$

or $$W_{\underline{a}}(D) = \frac{1 - \beta_1(\underline{a})D - \ldots - \beta_N(\underline{a})D^N}{1 + \alpha_1(\underline{a})D + \ldots + \alpha_N(\underline{a})D^N},$$

wherein $P_{\underline{a}}(D)$ is a noise prediction filter whose numerator polynomial coefficients and denominator polynomial coefficients depend on a data pattern $\underline{a}$, the numerator polynomial coefficients are denoted by $\gamma_i(\underline{a})$, and the denominator polynomial coefficients are denoted by $\alpha_i(\underline{a})$, and wherein $W_{\underline{a}}(D)$ is a noise whitening filter whose numerator polynomial coefficients and denominator polynomial coefficients depend on a data pattern $\underline{a}$, wherein the numerator polynomial coefficients are denoted by $\beta_i(\underline{a})$, and wherein the denominator polynomial coefficients are denoted by $\alpha_i(\underline{a})$. Also, the maximum-likelihood sequence detector comprises a metric computation unit that employs the plurality of IIR filters in the filter bank and the plurality of prediction error variances in the variance bank to adaptively compute detector branch metrics according to either:

$$m_k(p \to q) = \ln[\sigma_k^2(\underline{a})] + \frac{\left[y_k - \hat{s}_k(p \to q) - \sum_{i=1}^{N}\gamma_i(\underline{a})(y_{k-i} - \hat{s}_{k-i}(p)) + \sum_{i=1}^{N}\alpha_i(\underline{a})\hat{n}_{k-i}(p)\right]^2}{\sigma_k^2(\underline{a})}$$

or $$m_k(p \to q) = \ln[\sigma_k^2(\underline{a})] + \frac{\left[z_k(\underline{a}) - \hat{s}_k(p \to q) + \sum_{i=1}^{N}\beta_i(\underline{a})\hat{s}_{k-i}(p) + \sum_{i=1}^{N}\alpha_i(\underline{a})\hat{z}_{k-i}(p)\right]^2}{\sigma_k^2(\underline{a})}.$$

Other aspects and embodiments of the present invention will become apparent from the following detailed description, which, when taken in conjunction with the drawings, illustrate by way of example the principles of the invention.

DETAILED DESCRIPTION

Figure 1:
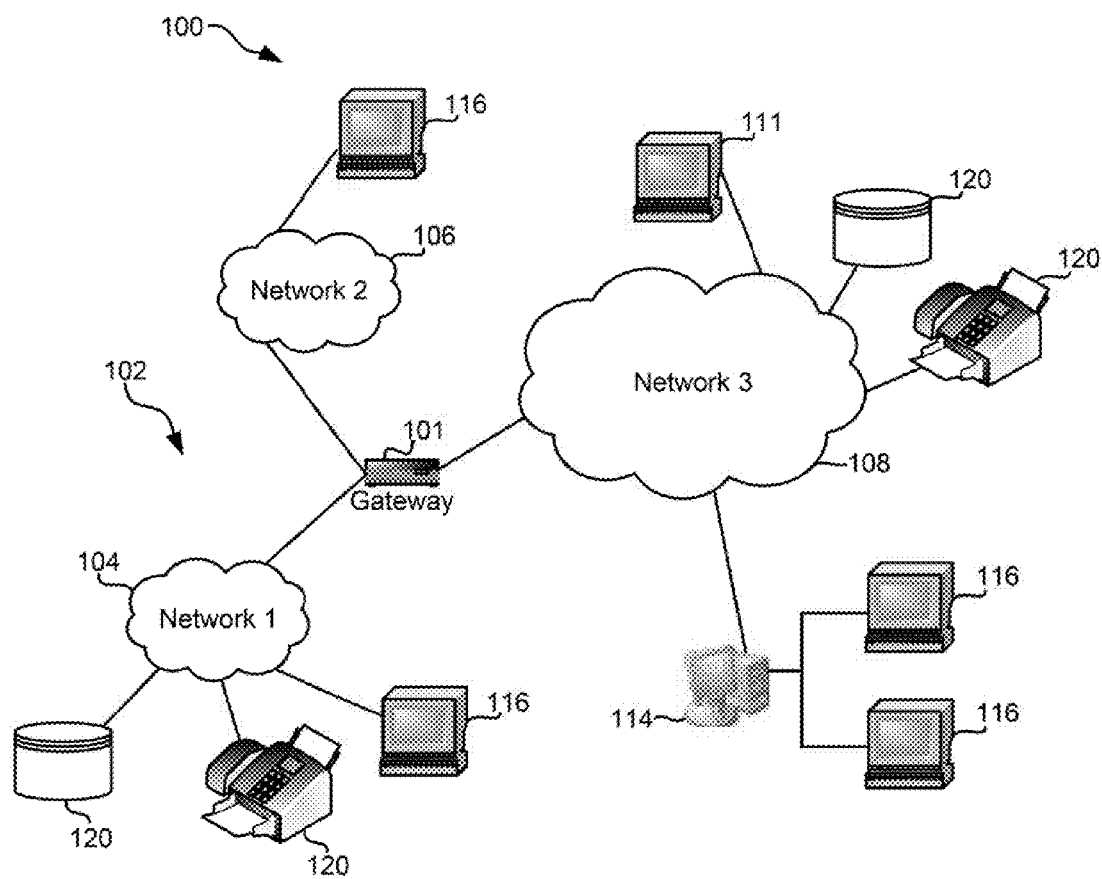
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a data detection system includes a coefficient-and-variance engine for selecting which infinite impulse response (IIR) filter and prediction error variance to process and store at any time, and a maximum-likelihood sequence detector. The coefficient-and-variance engine comprises a filter bank storing a plurality of IIR filters that represent a plurality of data-dependent noise whitening or noise prediction filters; a least-mean square (LMS) engine for adapting each IIR filter to actual noise conditions; a variance bank storing a plurality of prediction error variance values; and a data-dependent prediction error variance computation unit which updates the plurality of prediction error variance values. The maximum-likelihood sequence detector includes a metric computation unit that employs the plurality of IIR filters in the filter bank and the plurality of prediction error variances in the variance bank to adaptively compute detector branch metrics.

In another general embodiment, a method includes selecting which IIR filter and prediction error variance to process and store at any time from a filter bank storing a plurality of IIR filters that represent a plurality of data-dependent noise whitening or noise prediction filters and a variance bank storing a plurality of prediction error variance values; adapting each IIR filter to actual noise conditions; updating the plurality of prediction error variance values, and employing the plurality of IIR filters in the filter bank and the plurality of prediction error variances in the variance bank to adaptively compute detector branch metrics.

In another general embodiment, a data detection system includes a coefficient-and-variance engine for selecting which IIR filter and prediction error variance to process and store at any time, and a maximum-likelihood sequence detector. The coefficient-and-variance engine includes a filter bank storing a plurality of IIR filters that represent a plurality of data-dependent noise whitening or noise prediction filters, a LMS engine for adapting each IIR filter to actual noise conditions, a variance bank storing a plurality of prediction error variance values, and a data-dependent prediction error variance computation unit which updates the plurality of prediction error variance values. The plurality of IIR filters apply at least one of:

$$P_a(D) = \frac{\gamma_1(a)D + \ldots + \gamma_N(a)D^N}{1 + \alpha_1(a)D + \ldots + \alpha_N(a)D^N}$$

or $$W_a(D) = \frac{1 - \beta_1(a)D - \ldots - \beta_N(a)D^N}{1 + \alpha_1(a)D + \ldots + \alpha_N(a)D^N},$$

wherein $P_a(D)$ is a noise prediction filter whose numerator polynomial coefficients and denominator polynomial coefficients depend on a data pattern a, the numerator polynomial coefficients are denoted by $\gamma_i(a)$, and the denominator polynomial coefficients are denoted by $\alpha_i(a)$, and wherein $W_a(D)$ is a noise whitening filter whose numerator polynomial coefficients and denominator polynomial coefficients depend on a data pattern a, wherein the numerator polynomial coefficients are denoted by $\beta_i(a)$, and wherein the denominator polynomial coefficients are denoted by $\alpha_i(a)$. Also, the maximum-likelihood sequence detector comprises a metric computation unit that employs the plurality of IIR filters in the filter bank and the plurality of prediction error variances in the variance bank to adaptively compute detector branch metrics according to either:

$$m_k(p \to q) = \ln[\sigma_k^2(a)] + \frac{\left[y_k - \hat{s}_k(p \to q) - \sum_{i=1}^{N} \gamma_i(a)(y_{k-i} - \hat{s}_{k-i}(p)) + \sum_{i=1}^{N} \alpha_i(a)\hat{n}_{k-i}(p)\right]^2}{\sigma_k^2(a)}$$

or $$m_k(p \to q) = \ln[\sigma_k^2(a)] + \frac{\left[z_k(a) - \hat{s}_k(p \to q) + \sum_{i=1}^{N} \beta_i(a)\hat{s}_{k-i}(p) + \sum_{i=1}^{N} \alpha_i(a)\hat{z}_{k-i}(p)\right]^2}{\sigma_k^2(a)}.$$

As will be appreciated by one skilled in the art, the present invention may be embodied as a system, method, or computer program product. Accordingly, the present invention may take the form of an entirely hardware embodiment, a software embodiment (including firmware, resident software, microcode, etc.) operating an apparatus or an embodiment combining software and hardware aspects that may all generally be referred to herein as a "circuit," "module" or "system." Furthermore, the present invention may take the form of a computer program product stored in any tangible medium of expression having computer-usable program code stored in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

Figure 2A:
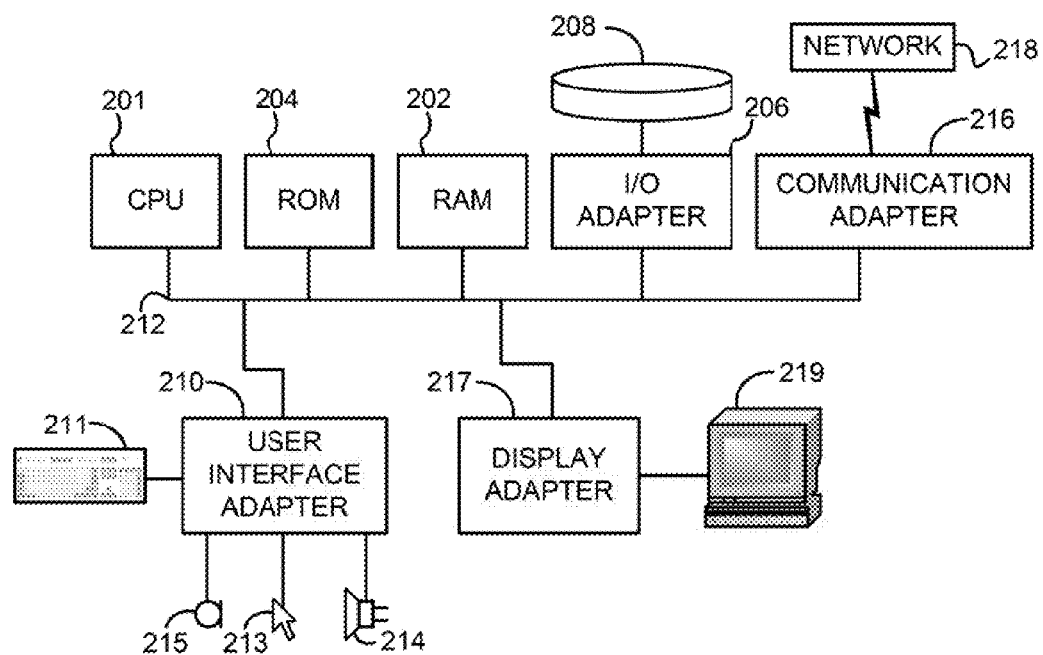
FIG. 2A shows a representative hardware environment that may be associated with the servers and/or clients of FIG. 1, in accordance with one embodiment.

The workstation shown in FIG. 2A includes a central processing unit (CPU) 201 for performing computations, Random Access Memory (RAM) 202, Read Only Memory (ROM) 204, an I/O adapter 206 for connecting peripheral devices such as magnetic storage units 208, such as a hard disk drive (HDD), to the bus 212, a user interface adapter 210 for connecting a keyboard 211, a mouse 213, a speaker 214, a microphone 215, and/or other user interface devices such as a touch screen, a digital camera (not shown), etc., to the bus 212, communication adapter 216 for connecting the workstation to a communication network 218 (e.g., a data processing network) and a display adapter 217 for connecting the bus 212 to a display device 219.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 2B:
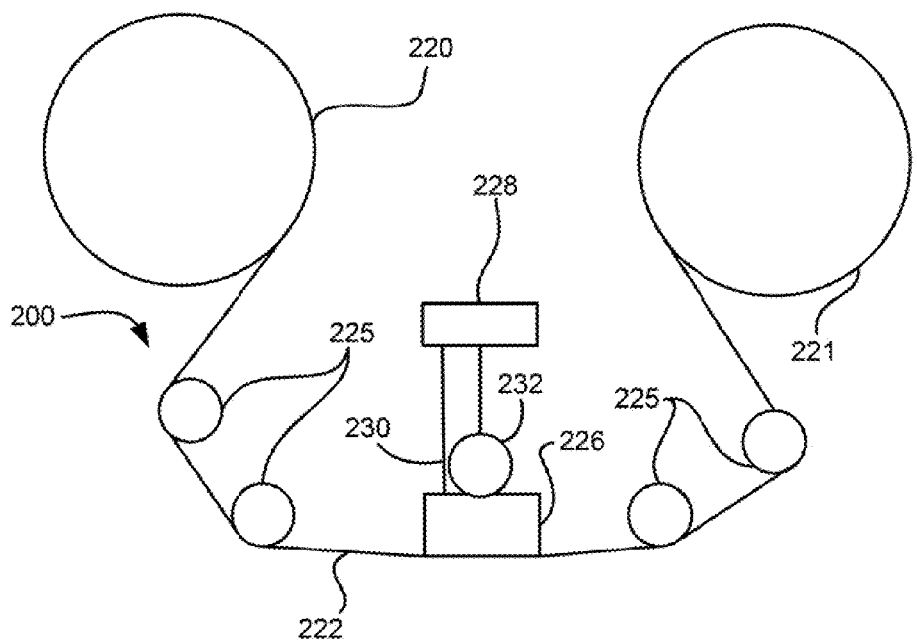
FIG. 2B is a schematic of tape drive system, in accordance with one embodiment.

FIG. 2B is a schematic diagram of a simplified tape drive system, in accordance with one embodiment, which may be a standalone unit, part of a tape library system, a peripheral 120 of FIG. 1, a magnetic storage unit 208 of FIG. 2A, etc. Such a tape drive may be employed in the context of an embodiment of the present invention. While one specific implementation of a tape drive is shown in FIG. 2B, it should be noted that the embodiments of the previous figures may be implemented in the context of any type of tape drive system.

As shown, a tape supply cartridge 220 and a take-up reel 221 are provided to support a tape 222. These may form part of a removable cassette and are not necessarily part of the system. Guides 225 guide the tape 222 across a preferably bidirectional tape head 226. Such tape head 226 may be a MR, GMR, TMR, spin-valve, or other type. Tape head 226 is in turn coupled to a controller assembly 228 via a connector cable 230. The controller 228, in turn, controls head functions such as servo following, write bursts, read functions, etc. An actuator 232 controls position of the head 226 relative to the tape 222.

A tape drive, such as that illustrated in FIG. 2B, includes drive motor(s) to drive the tape supply cartridge 220 and the take-up reel 221 to move the tape 222 linearly over the head 226. The tape drive also includes a read/write channel to transmit data to the head 226 to be recorded on the tape 222 and to receive data read by the head 226 from the tape 222. An interface is also provided for communication between the tape drive and a host (integral or external) to send and receive the data and for controlling the operation of the tape drive and communicating the status of the tape drive to the host, all as will be understood by those of skill in the art.

The introduction of noise-predictive maximum-likelihood (NPML) detection into hard disk drive (HDD) and magnetic tape storage channels represents a significant departure from the partial response maximum likelihood (PRML) read-channel design that had prevailed for many years following the transition from peak-detection based to fully digital read-channel implementations. After the successful adoption of NPML detection by the magnetic storage industry, an idea for more accurate noise prediction was formulated, motivated by observations that noise in the recording channel often exhibits nonstationarity in the form of written-data dependency, thereby resulting in improved data detection, if this dependency is accounted for during the detection process. By modeling the data-dependent noise as a finite-order Markov (or autoregressive) process, the optimum maximum-likelihood sequence detector for channels with intersymbol-interference (ISI) was derived. In particular, it was shown that when the data-dependent noise is conditionally Gauss-Markov, the branch metrics can be computed from the conditional second-order statistics of the noise process. In other words, the optimum maximum-likelihood sequence detector can be implemented efficiently by using the Viterbi algorithm, in which the branch-metric computation involves data-dependent noise prediction. Hence, in data-dependent NPML (DD-NPML) detection, according to some approaches, predictor coefficients and prediction error both depend on the local data pattern.

The implementation of NPML/DD-NPML detection gives rise to various trade-offs in terms of circuit complexity and achievable detection performance. One parameter that plays a role in this context is the time span of the noise prediction filters, which are usually realized in finite-impulse response (FIR) form. Consequently, when the noise process is highly correlated, many tap coefficients are used to achieve effective noise whitening. This is, for example, the case when the noise process exhibits a strong "moving average" component, as it happens when data-dependent transition noise becomes a significant contributor to the total noise that affects the readback signal. Unless reduced-state detection is employed, increasing the length of the prediction filter also increases the number of detector states exponentially.

The idea that long FIR filters can be approximated by short IIR filters is well known. A major obstacle to applying this idea to NPML detection, i.e., employing IIR rather than FIR noise prediction, is that the inclusion of an IIR filter in the receive path renders the overall recording channel of the IIR type as well. As a result, an infinite number of detector states are needed for sequence detection.

To address this concern, in one scheme, an embedding technique derived from reduced-state detection is used to achieve IIR-filtering-based NPML detection with a finite number of detector states. In another scheme, IIR-filtering-based NPML detection is achieved based on the Cholesky factorization of the correlation matrix of the noise process. However, the set of assumptions used to derive the detector, such as a perpendicular recording channel at moderate linear density, a first-order jitter model, and a banded noise-correlation matrix, makes the assessment of this second scheme, in terms of its general applicability and achievable performance, rather difficult.

Accordingly, IIR-filtering-based NPML detection is addressed for the data-dependent noise case herein. The expression "IIR DD-NPML" is used as an abbreviation. Two approaches are described: the first approach relies on the embedding technique mentioned above for the first scheme, so that a recursive structure is obtained for the noise prediction filter but not for the overall channel, hence allowing a detector with a finite number of states to be realized. The second approach does introduce a recursive structure for the overall channel, but relies on stored past tentative decisions to maintain a finite number of detector states.

Whenever convenient, the delay-operator notation is used to represent sequences as well as transfer functions. Sequences may also be represented in the time domain. Hence, the sequence of samples $\{x_k\}$ may equivalently be represented as $x(D)$, and a system impulse response with samples $\{g_k\}$ as the transfer function $G(D)$. The delay operator $D$ corresponds to the duration of one bit.

IIR DD-NPML: Approach 1

Figure 3:
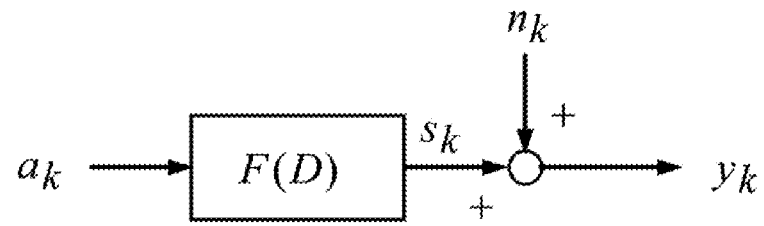
FIG. 3 shows a block diagram of a channel model, for reference with several embodiments.

In this approach, the readback signal is assumed to be equalized towards the target characteristic given in D-transform notation by $F(D)=1+f_1 D+\ldots f_v D^v$, where $v$ represents some finite intersymbol interference (ISI) span and the polynomial coefficients can take noninteger values. The readback signal after equalization $y_k$ is defined as shown in Equation 1, below:

$$y_k = s_k + n_k \qquad \text{Equation 1}$$

with $s_k$ denoting the signal component and $n_k$ denoting the noise component of $y_k$. The channel model is shown in FIG. 3, where the binary input symbol at time k is denoted by $a_k = \pm 1$.

In typical NPML detection, a FIR filter is used to generate a predicted estimate of the noise sample $\hat{n}_k$ at time $\hat{y}_k$, and the signal estimate $y_k$ as shown in Equation 2, below.

$$\hat{y}_k = \hat{s}_k + \hat{n}_k \qquad \text{Equation 2}$$

Equation 2 is employed for the branch metric computations in the Viterbi detector. Here, $\hat{s}_k$ denotes the signal estimate along the branch considered in the detector trellis. The computations performed amount to evaluating the quadratic term $(y_k - \hat{y}_k)^2$ in a state-dependent manner.

A similar approach is followed for IIR-filtering, where the noise estimate $\hat{n}_k$ is calculated through an IIR, instead of a FIR, noise-prediction filter. Assuming a noise-whitening filter with the form shown in Equation 3, below:

$$W(D) = \frac{B(D)}{A(D)} = \frac{1 - \beta_1 D - \ldots - \beta_N D^N}{1 + \alpha_1 D + \ldots + \alpha_N D^N} \qquad \text{Equation 3}$$

where numerator polynomials and denominator polynomials are assumed, without loss of generality, to be both of degree N, and $\alpha_i, \beta_i, i=1, \ldots, N$ denote polynomial coefficients, the noise-prediction filter is obtained as shown in Equation 4, below:

$$P(D) = 1 - W(D) = \frac{\gamma_1 D + \ldots + \gamma_N D^N}{1 + \alpha_1 D + \ldots + \alpha_N D^N} \qquad \text{Equation 4}$$

with $\gamma_i = \alpha_i + i = 1, \ldots, N$. The adaptive estimation of these polynomial coefficients using a least mean square (LMS) algorithm is explained later. The sequence of predicted noise samples $\hat{n}(D)$ is then given by Equation 5, below:

$$\hat{n}(D) = P(D) n(D) \qquad \text{Equation 5}$$

where $n(D)$ denotes the sequence of noise samples, $\{n_k\}$, or equivalently in the time domain by Equation 6, below:

$$\hat{n}_k = \sum_{i=1}^{N} \gamma_i n_{k-i} - \sum_{i=1}^{N} \alpha_i \hat{n}_{k-i} \qquad \text{Equation 6}$$

In Equation 6, the first summation on the right-hand side of the equation represents the contribution to the noise estimate due to N past noise samples and the second summation on the right-hand side of the equation being subtracted from the first summation represents the contribution to the noise estimate due to N past noise estimates. The $\alpha_i, \gamma_i, i=1, \ldots, N$ coefficients are the values with which these past samples need to be weighted.

In this approach, the sequence detector operates on the $2^\nu$-state trellis defined by the target polynomial F(D). The noise prediction process of Equations 5 and 6, which may be used for the branch metric computations, is embedded on the so-defined finite-state detector.

The branch metric at time k is computed by evaluating the quadratic term $(y_k - \hat{y}_k)^2$ in a state-dependent manner. However, in contrast to the case of FIR noise prediction, past noise sample estimates $\hat{n}_k$ are used in IIR noise prediction. To this end, at each time step during the detection process, any given state is associated with an additional survivor sequence, which is made of the predicted noise samples along the path memory leading to this state. Hence, when computing the branch metric from state p to state g, the noise samples $\hat{n}_{k-i}(p)$ associated with the survivor sequence of state p are used.

The noise terms $n_{k-i}$ in Equation 6 are obtained similarly to the FIR NPML case by evaluating the expression $n_{k-i} \cong y_{k-i} - \hat{s}_{k-i}$. However, because past signal estimates $\hat{s}_{k-1}, \hat{s}_{k-2}, \ldots$ are also used, these estimates can likewise be obtained from the data path memory associated with each state, as is done in reduced-state detection. The branch metric $m_k$ on the branch from state p to state g at time k is given by Equation 7, below:

$$m_k(p \rightarrow q) = [y_k - \hat{y}_k(p \rightarrow q)]^2 \qquad \text{Equation 7}$$

where the notation (p→q) refers to the considered state transition. Using Equation 2 and Equation 6, Equation 8 can be derived, below:

$$m_k(p \rightarrow q) = \qquad \text{Equation 8}$$
$$\left[ y_k - \hat{s}_k(p \rightarrow q) - \sum_{i=1}^{N} \gamma_i(y_{k-i} - \hat{s}_{k-i}(p)) + \sum_{i=1}^{N} \alpha_i \hat{n}_{k-i}(p) \right]^2$$

with $\hat{s}_{k-i}(p)$ and $\hat{n}_{k-i}(p)$ denoting the value of the signal sample, and the noise sample, respectively, estimated at time k−i associated with the survivor sequences of state p at time k.

To achieve data dependent IIR NPML detection, the branch metric $m_k(p \rightarrow q)$ is modified similarly to the FIR DD-NPML method. For example, the noise predictor coefficients are made to depend on a specific bit pattern a and the quadratic term from Equation 8 is scaled by the noise prediction error variance $\sigma_k^2(\underline{a})$, which is also pattern dependent, and the logarithm of this same variance is added to produce Equation 9, below.

$$m_k(p \rightarrow q) = \ln[\sigma_k^2(\underline{a})] + \frac{\left[ y_k - \hat{s}_k(p \rightarrow q) - \sum_{i=1}^{N} \gamma_i(\underline{a}) \right.}{\sigma_k^2(\underline{a})}$$
$$\frac{\left. (y_{k-i} - \hat{s}_{k-i}(p)) + \sum_{i=1}^{N} \alpha_i(\underline{a}) \hat{n}_{k-i}(p) \right]^2}{\sigma_k^2(\underline{a})} \qquad \text{Equation 9}$$

Figure 4:
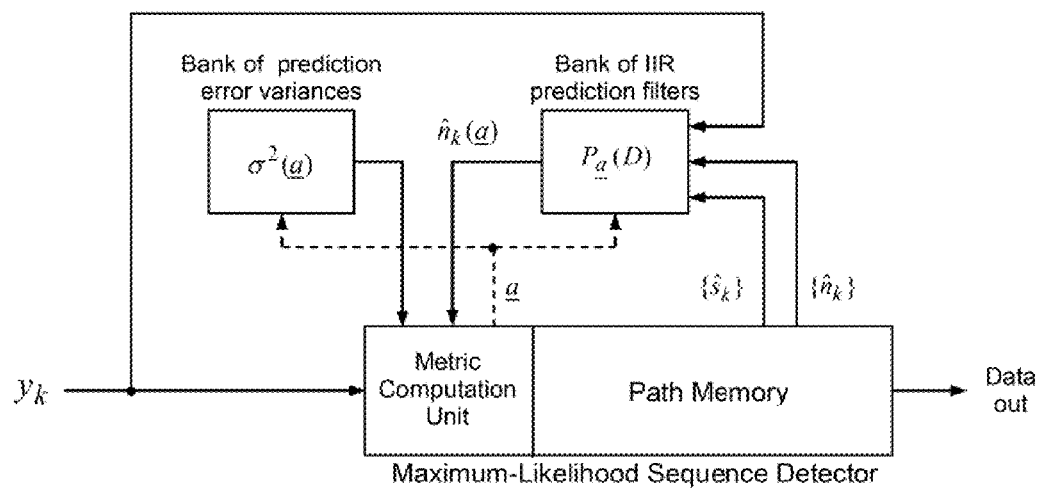
FIG. 4 shows a block diagram of an IIR DD-NPML detector, in accordance with one embodiment.

A block diagram of the IIR DD-NPML detector is shown in FIG. 4, according to one embodiment. The adaptive estimation of the data-dependent prediction filters, indicated in FIG. 4 by $P_{\underline{a}}(D)$ and defined in Equation 10, below:

$$P_{\underline{a}}(D) = \frac{\gamma_1(\underline{a})D + \ldots + \gamma_N(\underline{a})D^N}{1 + \alpha_1(\underline{a})D + \ldots + \alpha_N(\underline{a})D^N} \qquad \text{Equation 10}$$

as well as the calculation of the variance terms $\sigma_k^2(\underline{a})$ are addressed in further detail below.

IIR DD-NPML: Approach 2

In the second approach, the readback signal after equalization, $y_k = s_k + n_k$ (see the channel model of FIG. 3), is input to a IIR noise-whitening filter W(D), which provides the signal $z_k$ at its output. In D-transform notation, z(D) is represented by Equation 11, below.

$$z(D) = W(D)y(D) = W(D)s(D) + e(D) \qquad \text{Equation 11}$$

Provided that the prediction error sequence e(D)=W(D)n(D) has been sufficiently whitened by the whitening filters, sequence detection based on the minimization of $(z_k-\hat{z}_k)^2$ can be performed, where $\hat{z}_k$, the estimate of the signal at the output of the noise whitening filter, is given by Equation 12, below.

$$\hat{z}_k = \hat{s}_k - \sum_{i=1}^{N}\beta_i \hat{s}_{k-i} - \sum_{i=1}^{N}\alpha_i \hat{z}_{k-i} \qquad \text{Equation 12}$$

In this approach, a detector trellis with $2^{N+v}$ states is used, corresponding, similarly to the FIR NPML detection case, to the target polynomial $G(D)=F(D)B(D)$. To be able to compute the "feedback term" that involves the a coefficients in Equation 12', at each time step during the detection process, any given state is associated with an additional survivor sequence, which contains the estimated signal samples $\hat{z}_k$ along the path memory leading to this state. Hence, when computing the branch metric from state p to state q, the signal estimates $\hat{z}_{k-i}(p)$ associated with the survivor sequence of state p are used. The branch metric is thus expressed as shown in Equation 13, below:

$$m_k(p \to q) = [z_k - \hat{z}_k(p \to q)]^2, \qquad \text{Equation 13}$$

$$m_k(p \to q) = \left[z_k - \hat{s}_k(p \to q) + \sum_{i=1}^{N}\beta_i \hat{s}_{k-i}(p) + \sum_{i=1}^{N}\alpha_i \hat{z}_{k-i}(p)\right]^2$$

with $\hat{s}_{k-i}(p)$ and $\hat{z}_{k-i}(p)$ denoting the value of the signal sample and the noisy signal sample, respectively, estimated at time k-i and associated with the survivor sequences of state p at time k.

It is seen that this scheme does not restrict, as in Approach 1, the number of detector states to be solely determined by the polynomial $F(D)$. Similar to Approach I, a state-reduction technique is employed to achieve IIR filtering. However, Approach 2 offers the advantage of allowing a higher flexibility in defining the detector target and the number of detector states. As such, better tradeoffs may be enabled in terms of implementation complexity, error propagation, and detection performance.

The detector is extended to the data-dependent case by making the whitening filter coefficients $\alpha_i$ and $\beta_i$ depend on the data pattern $\bar{a}$, and by including into the branch metric computations, as for Approach 1, the variance of the noise prediction error $\sigma_k^2(\underline{a})$. Also, the input signal $z_k(\underline{a})$ is obtained by filtering the signal $y_k$ with the IIR whitening filter for the data pattern $\underline{a}$. The branch metric for the data-dependent detector becomes as shown in Equation 14, below.

$$m_k(p \to q) = \ln[\sigma_k^2(\underline{a})] + \frac{\left[z_k(\underline{a}) - \hat{s}_k(p \to q) + \sum_{i=1}^{N}\beta_i(\underline{a})\hat{s}_{k-i}(p) + \sum_{i=1}^{N}\alpha_i(\underline{a})\hat{z}_{k-i}(p)\right]^2}{\sigma_k^2(\underline{a})} \qquad \text{Equation 14}$$

Figure 5:
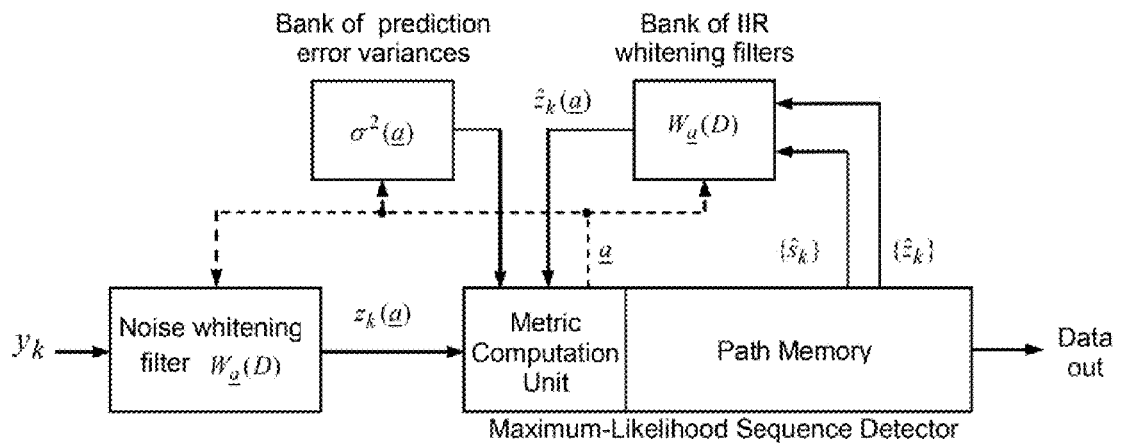
FIG. 5 shows a block diagram of an IIR DD-NPML detector, according to another embodiment.

A block diagram of the IIR DD-NPML detector is shown in FIG. 5, according to another embodiment. The adaptive estimation of the data-dependent noise-whitening filters, indicated in the figure by $W_{\underline{a}}(D)$ and defined in Equation 15, below:

$$W_{\underline{a}}(D) = \frac{1 - \beta_1(\underline{a})D - \ldots - \beta_N(\underline{a})D^N}{1 + \alpha_1(\underline{a})D + \ldots + \alpha_N(\underline{a})D^N} \qquad \text{Equation 15}$$

as well as the calculation of the variance terms $\sigma_k^2(\underline{a})$ are addressed in more detail later.

Figure 6:
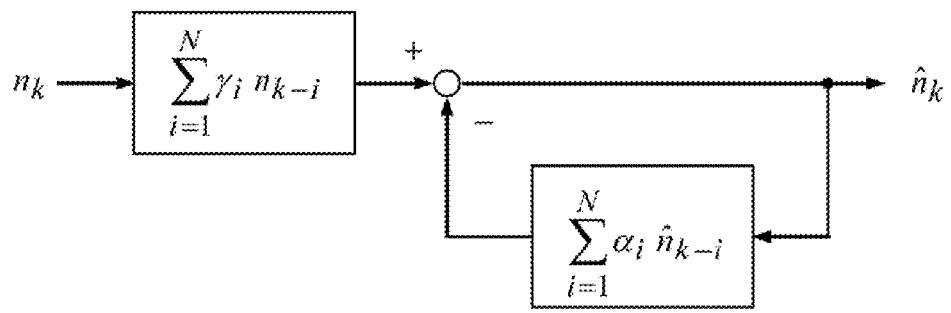
FIG. 6 shows a block diagram of an IIR noise prediction filter, in accordance with one embodiment.

Adaptive Estimation of the IIR Filter Coefficients and Prediction Error Variance The IIR noise prediction filter defined in Equation 6 is shown in FIG. 6. An adaptive procedure is used to determine the filter coefficients that minimize the mean square value of the prediction error $E\{(n_k-\hat{n}_k)^2\}$.

Unlike the FIR noise prediction case, the cost function minimized in the IIR filtering case is in general a nonquadratic function of the filter coefficients. Note, however, that if the IIR filter has a sufficiently large number of poles and zeros, then the mean square error surface tends to become unimodal. Hence, a more reliable convergence can be achieved at the expense of an increased implementation complexity. Another potential problem that needs to be considered is the fact that IIR filters may become unstable during the adaptation process.

An LMS algorithm can be developed for the IIR filtering case. This algorithm, which involves some approximations due to the recursive nature of the filter, is obtained as shown in Equations 16a and 16b, below:

$$\begin{bmatrix} \gamma_{1,k+1} \\ \vdots \\ \gamma_{N,k+1} \end{bmatrix} = \begin{bmatrix} \gamma_{1,k} \\ \vdots \\ \gamma_{N,k} \end{bmatrix} + \alpha e_k \begin{bmatrix} a_{1,k} \\ \vdots \\ a_{N,k} \end{bmatrix} \qquad \text{Equation 16a}$$

$$\begin{bmatrix} \alpha_{1,k+1} \\ \vdots \\ \alpha_{N,k+1} \end{bmatrix} = \begin{bmatrix} \alpha_{1,k} \\ \vdots \\ \alpha_{N,k} \end{bmatrix} - \beta e_k \begin{bmatrix} b_{1,k} \\ \vdots \\ b_{N,k} \end{bmatrix} \qquad \text{Equation 16b}$$

where $\gamma_{i,k}$ and $\alpha_{i,k}$ are the estimated values of the filter coefficients $\gamma_i$ and $\alpha_i$ at time k, respectively, $e_k = n_k - \hat{n}_k$ is the prediction error, and $\alpha$ and $\beta$ denote stepsizes. The righmost vectors in these two equations are in turn calculated through the following recursions, as shown in Equations 16c and 16d, below.

$$\begin{bmatrix} a_{1,k} \\ \vdots \\ a_{N,k} \end{bmatrix} = \begin{bmatrix} n_{k-1} \\ \vdots \\ n_{k-N} \end{bmatrix} - \begin{bmatrix} a_{1,k-1} & \ldots & a_{1,k-N} \\ \vdots & & \vdots \\ a_{N,k-1} & \ldots & a_{N,k-N} \end{bmatrix} \begin{bmatrix} \alpha_{1,k} \\ \vdots \\ \alpha_{N,k} \end{bmatrix} \qquad \text{Equation 16c}$$

$$\begin{bmatrix} b_{1,k} \\ \vdots \\ b_{N,k} \end{bmatrix} = \begin{bmatrix} \hat{n}_{k-1} \\ \vdots \\ \hat{n}_{k-N} \end{bmatrix} - \begin{bmatrix} b_{1,k-1} & \ldots & b_{1,k-N} \\ \vdots & & \vdots \\ b_{N,k-1} & \ldots & b_{N,k-N} \end{bmatrix} \begin{bmatrix} \alpha_{1,k} \\ \vdots \\ \alpha_{N,k} \end{bmatrix} \qquad \text{Equation 16d}$$

Note that to simplify the notation, the dependency of the coefficients $\gamma_{i,k}$ and $\alpha_{i,k}$, as well as $a_{i,k}$ and $b_{i,k}$, on the data pattern $\bar{a}$ has not been indicated.

The above IIR-LMS algorithm may be complex to implement. One possible approach to simplify the algorithm consists in applying the traditional FIR LMS algorithm to both the feedforward and the feedback filters. In this case, the update equations are given by Equations 17a and 17b, below:

$$\begin{bmatrix} \gamma_{1,k+1} \\ \vdots \\ \gamma_{N,k+1} \end{bmatrix} = \begin{bmatrix} \gamma_{1,k} \\ \vdots \\ \gamma_{N,k} \end{bmatrix} + \alpha e_k \begin{bmatrix} n_{k-1} \\ \vdots \\ n_{k-N} \end{bmatrix} \quad \text{Equation 17a}$$

$$\begin{bmatrix} \alpha_{1,k+1} \\ \vdots \\ \alpha_{N,k+1} \end{bmatrix} = \begin{bmatrix} \alpha_{1,k} \\ \vdots \\ \alpha_{N,k} \end{bmatrix} - \beta e_k \begin{bmatrix} \hat{n}_{k-1} \\ \vdots \\ \hat{n}_{k-N} \end{bmatrix} \quad \text{Equation 17b}$$

It is seen that this adaptation procedure seeks to orthogonalize the error signal $e_k = n_k - \hat{n}_k$ and the signal samples contained in both the feedforward and the feedback delay lines. Some alternatives to this algorithm can also be used, such as updating the feedforward filter first and obtaining its output, as shown in Equation 18 below.

$$w_k = \sum_{i=1}^{N} \gamma_{i,k+1} n_{k-i} \quad \text{Equation 18}$$

Then the noise estimate $\hat{n}_k$ is computed by adding to $w_k$ the signal at the output of the feedback filter. This noise estimate is used in the second set of update equations for the $\alpha_{i,k+1}$, i=1, ..., N.

It is possible to derive, from the above LMS algorithm for the noise prediction filter, the coefficients of the numerator polynomial of the noise whitening filter by using $\beta_{i,k} = \gamma_{i,k} - \alpha_{i,k}$, i=1, ..., N. Alternatively, the LMS recursions can be performed for the whitening filter coefficients directly. For example, Equation 18 then becomes Equations 19a and 19b, below.

$$\begin{bmatrix} \beta_{1,k+1} \\ \vdots \\ \beta_{N,k+1} \end{bmatrix} = \begin{bmatrix} \beta_{1,k} \\ \vdots \\ \beta_{N,k} \end{bmatrix} + \alpha e_k \begin{bmatrix} e_{k-1} \\ \vdots \\ e_{k-N} \end{bmatrix} \quad \text{Equation 19a}$$

$$\begin{bmatrix} \alpha_{1,k+1} \\ \vdots \\ \alpha_{N,k+1} \end{bmatrix} = \begin{bmatrix} \alpha_{1,k} \\ \vdots \\ \alpha_{N,k} \end{bmatrix} - \beta e_k \begin{bmatrix} \hat{n}_{k-1} \\ \vdots \\ \hat{n}_{k-N} \end{bmatrix} \quad \text{Equation 19b}$$

The variance of the noise prediction error can readily be obtained from the prediction error $e_k$ used above for the LMS adaptations. A simple algorithm is given by the following low-pass filtering operation, as shown in Equation 20, below:

$$\sigma_k^2 = (1-\epsilon)\sigma_{k-1}^2 + \epsilon e_k^2 \quad \text{Equation 20}$$

where $\epsilon \ll 1$. Again, the dependency of $e_k$, and hence of $\sigma_k^2$, on the data pattern a has been omitted.

Implementation of the IIR LMS Adaptation and Prediction Error Variance Estimation Functions This section describes a practical realization of the two adaptive functions that are implemented as part of the IIR DD-NPML detectors explained in the previous sections. These functions are the dynamic estimation of the coefficients of the IIR noise prediction filter and the variances of the noise prediction errors. They will be described with reference to the diagram of FIG. 7.

As mentioned earlier, the detector needs to maintain, in addition to the survivor sequences of data bits, an additional set of survivor sequences that are associated with each state and store past values of predicted noise samples $\{\hat{n}_k\}$.

Figure 7:
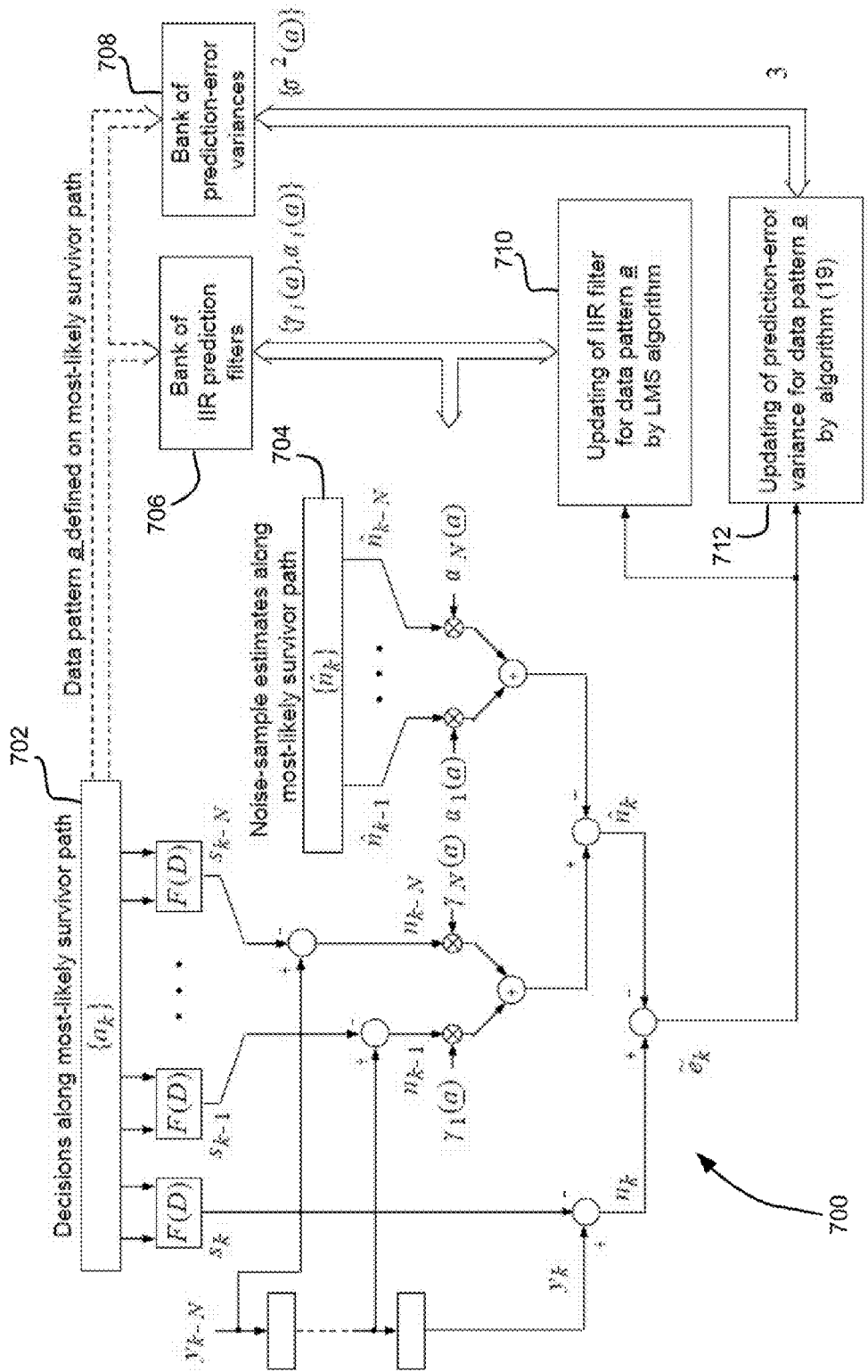
FIG. 7 shows a block diagram of a coefficient and variance engine that may be implemented as part of the IIR DD-NPML detector, according to several embodiments.

The detector, therefore, can generate at every time instant a sequence of detected bit values and a sequence of predicted noise sample estimates, which are both associated with the most likely state at this time instant. In FIG. 7, a coefficient and variance engine 700 is shown according to one embodiment. The released bit and predicted noise values, indicated by the $\{a_k\}$ box 702 and the $\{\hat{n}_k\}$ box 704, are taken at a suitable depth from the respective survivor sequences. Furthermore, the so-released data bits are assumed to define the data pattern a on which the filter coefficients and prediction error variances are conditioned. In FIG. 7, the pattern a is shown to address a bank of prediction filters 706 and a bank of stored prediction error variances 708. The addressed prediction filters and variances are updated by first creating the error signal $\check{e}_k$ and then using this error signal for the LMS algorithm 710 as well as the algorithm for error variance computation 712 as explained previously. Note that the LMS algorithm 710 also involves the signals $n_{k-i}$ and $\hat{n}_{k-i}$, i=1, ..., N, obtained in the generation of $\check{e}_k$, although this is not explicitly shown in FIG. 7. After the updating equations are calculated, the new values are stored back into the bank of filter coefficients 706 and error variances 708, replacing the old values that were held for the specific pattern a.

According to some approaches, noise-prediction and/or noise-whitening filters may be employed that are realized in IIR form. Such filters allow more efficient noise prediction than FIR filters with similar complexity, in cases where the noise process has, e.g., a nonnegligible moving average component. Therefore, it is possible to use short IIR prediction filters to achieve a detection performance that could only be achieved by much longer FIR noise prediction filters. A data-dependent IIR-NPML detection method that is fully adaptive is unique to the art. Some advantages of using this type of detection method stem from its superior detection performance as compared with a FIR-based data-dependent detector of similar complexity, and also from its ability to address the high variability that is present in a tape storage system because the detector target dynamically adapts itself to the channel characteristics in real time.

Figure 8:
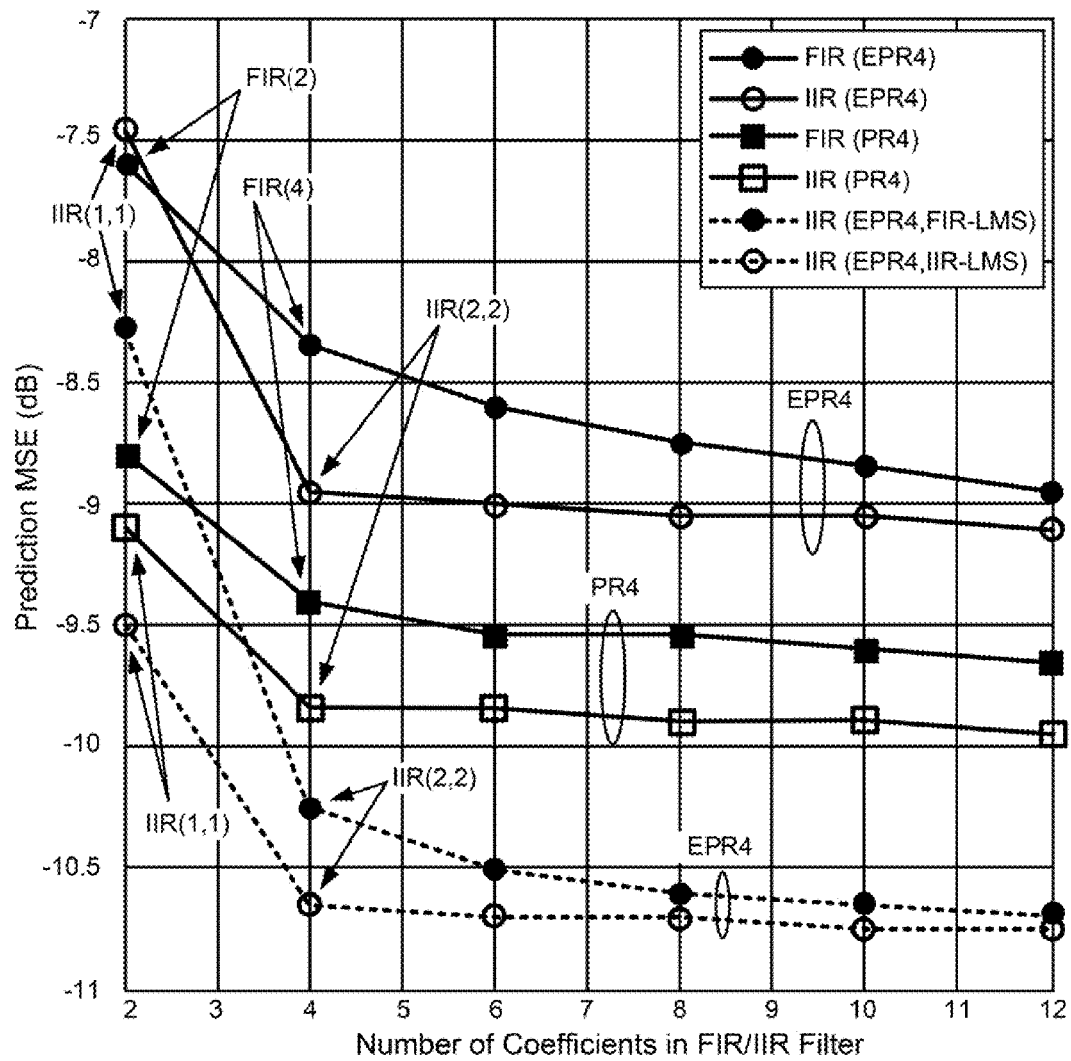
FIG. 8 shows a plot of a comparison between IIR and FIR noise filtering, in one illustrative example, for various filter types.

Referring to FIG. 8, a comparison of IIR and FIR noise filtering is provided, where the mean-square value of the prediction error, i.e., the mean square error (MSE) $E\{(n_k - \hat{n}_k)^2\}$, is given for different types of prediction filters as a function of the number of filter coefficients. In this figure, the notation FIR(N) is used to denote an N-coefficient FIR prediction filter and IIR(N1,N2) is used to denote an IIR prediction filter with N1 numerator-polynomial coefficients and N2 denominator-polynomial coefficients. (Note that no NPML detection is performed here, only noise prediction performance is illustrated.) The Class-4 Partial Response "PR4" (respectively, Extended Class-4 Partial Response "EPR4") label refers to the cases where the signal at the predictor input was shaped towards the PR4 (EPR4) target characteristic. It can be seen that IIR filtering outperforms FIR filtering in at least two aspects. First, IIR filtering is more effective at reducing noise for a given number of filter coefficients, e.g., when 4, 6, 8, etc., total number of filter coefficients are used, IIR filtering reduces noise power more than FIR filtering does. Second, the performance achieved by long to very long FIR filters, which require massive calculations, may be achieved with relatively short IIR filters, e.g., in the EPR4 cases shown, an IIR filter using 4 filter coefficients (IIR(2,2), open circles, solid line curve second from the top) achieves at least equal performance as a FIR filter using 12 filter coefficients (closed circles, solid line curve at top). The two lowest curves in FIG. 8 show the effect of the type of LMS algorithm used to adapt the IIR noise predictors: both of these curves are obtained for EPR4 signal shaping and IIR noise prediction (using another readback waveform than for the two other EPR4 cases shown in FIG. 8). The upper curve (closed circles, dashed line) corresponds to using the FIR-LMS algorithm given in Equation 17 and the lower curve (open circles, dashed line) to using the IIR-LMS algorithm of Equation 16. It is seen that the IIR-LMS algorithm achieves better performance than the FIR-LMS algorithm does, but its implementation is clearly more complex.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A data detection system, comprising:
   a coefficient-and-variance engine for selecting which infinite impulse response (IIR) filter and prediction error variance to process and store at any time; and
   a maximum-likelihood sequence detector,
   wherein the coefficient-and-variance engine comprises:
     a filter bank storing a plurality of IIR filters that represent a plurality of data-dependent noise whitening or noise prediction filters;
     a least-mean square (LMS) engine for adapting each IIR filter to actual noise conditions,
     a variance hank storing a plurality of prediction error variance values; and
     a data-dependent prediction error variance computation unit which updates the plurality of prediction error variance values,
   wherein the maximum-likelihood sequence detector comprises a metric computation unit that employs the plurality of IIR filters in the filter bank and the plurality of prediction error variances in the variance bank to adaptively compute detector branch metrics.

2. The data detection system as recited in claim 1, wherein the LMS engine employs one of finite impulse response (FIR) and IIR.

3. The data detection system as recited in claim 1, wherein a data-dependency of the plurality of IIR filters is restricted to data patterns shorter than a channel target intersymbol interference (ISI) span.

4. The data detection system as recited in claim 1, wherein a data dependency of the plurality of IIR filters is extended to data patterns longer than or equal to a channel target intersymbol interference (ISI) span.

5. The data detection system as recited in claim 1, wherein a single IIR filter is used for a plurality of data patterns which yield similar filter coefficients and prediction error variance.

6. The data detection system as recited in claim 1, wherein the plurality of IIR filters apply:

$$P_a(D) = \frac{\gamma_1(a)D + \ldots + \gamma_N(a)D^N}{1 + \alpha_1(a)D + \ldots + \alpha_N(a)D^N},$$

wherein $P_a(D)$ is a noise prediction filter whose numerator polynomial coefficients and denominator polynomial coefficients depend on a data pattern a, wherein the numerator polynomial coefficients are denoted by $\gamma_i(a)$, and wherein the denominator polynomial coefficients are denoted by $\alpha_i(a)$.

7. The data detection system as recited in claim 1, wherein the plurality of IIR filters apply:

$$W_a(D) = \frac{1 - \beta_1(a)D - \ldots - \beta_N(a)D^N}{1 + \alpha_1(a)D + \ldots + \alpha_N(a)D^N},$$

wherein $W_a(D)$ is a noise whitening filter whose numerator polynomial coefficients and denominator polynomial coefficients depend on a data pattern a, wherein the numerator polynomial coefficients are denoted by $\beta_i(a)$, and wherein the denominator polynomial coefficients are denoted by $\alpha_i(a)$.

8. The data detection system as recited in claim 1, wherein the data-dependent prediction error variance computation unit updates the plurality of prediction error variance values based on occurrence of an event.

9. The data detection system as recited in claim 8, wherein the event is chosen from a list consisting of: the LMS engine updating an IIR filter, passage of a predetermined period of time, and occurrence of a trigger event indicating that a particular variance value stored in the variance bank is to be updated.

10. The data detection system as recited in claim 1, wherein the LMS engine adapts each IIR filter to actual noise conditions continuously.

11. A method, comprising:
    selecting which infinite impulse response (IIR) filter and prediction-error variance to process and store at any time from a filter bank storing a plurality of IIR filters that represent a plurality of data-dependent noise whitening or noise prediction filters and a variance hank storing a plurality of prediction error variance values;
    adapting each IIR filter to actual noise conditions:
    updating the plurality of prediction error variance values; and
    employing the plurality of IIR filters in the filter bank and the plurality of prediction error variances in the variance bank to adaptively compute detector branch metrics,
    wherein a data-dependency of the plurality of IIR filters is restricted to at least one of:
    data patterns shorter than a channel target intersymbol interference (ISI) span, and
    data patterns longer than or equal to the channel target ISI span.

12. The method as recited in claim 11, wherein each IIR filter is adapted to actual noise conditions using at least one of: finite impulse response (FIR) and IIR.

13. The method as recited in claim 11, wherein the data-dependency of the plurality of IIR filters is restricted to data patterns shorter than the channel target ISI span.

14. The method as recited in claim 11, wherein the data-dependency of the plurality of IIR filters is extended to data patterns longer than or equal to the channel target ISI span.

15. The method as recited in claim 11, wherein a single IIR filter is used for a plurality of data patterns which yield similar filter coefficients and prediction error variance.

16. The method as recited in claim 11, wherein the plurality of IIR filters apply:

$$P_a(D) = \frac{\gamma_1(a)D + \ldots + \gamma_N(a)D^N}{1 + \alpha_1(a)D + \ldots + \alpha_N(a)D^N},$$

wherein $P_a(D)$ is a noise prediction filter whose numerator polynomial coefficients and denominator polynomial coefficients depend on a data pattern a, wherein the numerator polynomial coefficients are denoted by $\gamma_i(\underline{a})$ and wherein the denominator polynomial coefficients are denoted by $\alpha_i(\underline{a})$.

17. The method as recited in claim 11, wherein the plurality of IIR filters apply:

$$W_{\underline{a}}(D) = \frac{1 - \beta_1(\underline{a})D - \ldots - \beta_N(\underline{a})D^N}{1 + \alpha_1(\underline{a})D + \ldots + \alpha_N(\underline{a})D^N},$$

wherein $W_a(D)$ is a noise whitening filter whose numerator polynomial coefficients and denominator polynomial coefficients depend on a data pattern a, wherein the numerator polynomial coefficients are denoted by $\beta_i(\underline{a})$, and wherein the denominator polynomial coefficients are denoted by $\alpha_i(\underline{a})$.

18. The method as recited in claim 11, wherein the plurality of prediction error variance values are updated based on occurrence of an event, wherein the event is chosen from a list consisting of: the updating of an IIR filter, passage of a predetermined period of time, and occurrence of a trigger event indicating that a particular variance value stored in the variance bank is to be updated.

19. The method as recited in claim 11, wherein each IIR filter is adapted to actual noise conditions continuously.

20. A data detection system, comprising:
  a coefficient-and-variance engine for selecting which infinite impulse response (IIR) filter and prediction error variance to process and store at any time; and
  a maximum-likelihood sequence detector,
  wherein the coefficient-and-variance engine comprises:
    a filter hank storing a plurality of IIR filters that represent a plurality of data-dependent noise whitening or noise prediction filters;
    a least-mean square (LMS) engine for adapting each IIR filter to actual noise conditions;
    a variance bank storing a plurality of prediction error variance values, and
    a data-dependent prediction error variance computation unit which updates the plurality of prediction error variance values,
  wherein the plurality of IIR filters apply at least one of:

$$P_{\underline{a}}(D) = \frac{\gamma_1(\underline{a})D + \ldots + \gamma_N(\underline{a})D^N}{1 + \alpha_1(\underline{a})D + \ldots + \alpha_N(\underline{a})D^N}$$

or $$W_{\underline{a}}(D) = \frac{1 - \beta_1(\underline{a})D - \ldots - \beta_N(\underline{a})D^N}{1 + \alpha_1(\underline{a})D + \ldots + \alpha_N(\underline{a})D^N},$$

wherein $P_a(D)$ is a noise prediction filter whose numerator polynomial coefficients and denominator polynomial coefficients depend on a data pattern a, the numerator polynomial coefficients are denoted by $\gamma_i(\underline{a})$, and the denominator polynomial coefficients are denoted by $\alpha_i(\underline{a})$ and wherein $W_a(D)$ is a noise whitening filter whose numerator polynomial coefficients and denominator polynomial coefficients depend on a data pattern a, wherein the numerator polynomial coefficients are denoted by $\beta_i(\underline{a})$, and wherein the denominator polynomial coefficients are denoted by $\alpha_i(\underline{a})$ wherein the maximum-likelihood sequence detector comprises a metric computation unit that employs the plurality of IIR filters in the filter bank and the plurality of prediction error variances in the variance bank to adaptively compute detector branch metrics according to either:

$$m_k(p \to q) = \ln[\sigma_k^2(\underline{a})] + \frac{\left[y_k - \hat{s}_k(p \to q) - \sum_{i=1}^{N} \gamma_i(\underline{a})(y_{k-i} - \hat{s}_{k-i}(p)) + \sum_{i=1}^{N} \alpha_i(\underline{a})\hat{n}_{k-i}(p)\right]^2}{\sigma_k^2(\underline{a})}$$

or $$m_k(p \to q) = \ln[\sigma_k^2(\underline{a})] + \frac{\left[z_k(\underline{a}) - \hat{s}_k(p \to q) + \sum_{i=1}^{N} \beta_i(\underline{a})\hat{s}_{k-i}(p) + \sum_{i=1}^{N} \alpha_i(\underline{a})\hat{z}_{k-i}(p)\right]^2}{\sigma_k^2(\underline{a})}.$$

* * * * *